(12) United States Patent
Kondo et al.

(10) Patent No.: US 12,196,337 B2
(45) Date of Patent: Jan. 14, 2025

(54) DIRECTIONAL AND FLOW CONTROL VALVE AND HYDRAULIC SYSTEM

(71) Applicant: KAWASAKI JUKOGYO KABUSHIKI KAISHA, Kobe (JP)

(72) Inventors: Akihiro Kondo, Kobe (JP); Hideyasu Muraoka, Kobe (JP); Yoshiyuki Tode, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 61 days.

(21) Appl. No.: 18/031,504

(22) PCT Filed: Oct. 11, 2021

(86) PCT No.: PCT/JP2021/037565
§ 371 (c)(1),
(2) Date: Apr. 12, 2023

(87) PCT Pub. No.: WO2022/080311
PCT Pub. Date: Apr. 21, 2022

(65) Prior Publication Data
US 2023/0375093 A1    Nov. 23, 2023

(30) Foreign Application Priority Data

Oct. 13, 2020  (JP) ................................ 2020-172349

(51) Int. Cl.
*F16K 11/20*  (2006.01)
*F16K 11/22*  (2006.01)
(Continued)

(52) U.S. Cl.
CPC ........ *F16K 31/1225* (2013.01); *F16K 11/207* (2013.01); *F16K 11/22* (2013.01)

(58) Field of Classification Search
CPC ........ F16K 11/10; F16K 11/20; F16K 11/207; F16K 11/22; F16K 11/24; F16K 31/1225
See application file for complete search history.

(56) References Cited

U.S. PATENT DOCUMENTS 5,692,427 A * 12/1997 Yoshida ................ E02F 9/2271
91/28
6,357,276 B1    3/2002 Koehler et al.
(Continued)

FOREIGN PATENT DOCUMENTS

JP          H11-241702 A       9/1999

*Primary Examiner* — Kelsey E Cary
(74) *Attorney, Agent, or Firm* — Oliff PLC

(57) ABSTRACT

A directional and flow control valve includes: a housing with a pump port, a first supply/discharge port, a second supply/discharge port, and a tank port, the housing including therein a first pilot chamber, a second pilot chamber, and a third pilot chamber; and a first spool and a second spool, which are independent of each other. The first spool includes a first end surface facing the first pilot chamber and a second end surface facing the third pilot chamber. The second spool includes a first end surface facing the second pilot chamber and a second end surface facing the third pilot chamber. The first spool brings the first supply/discharge port into one of the pump port or the tank port, and the second spool brings the second supply/discharge port into the other one of the pump port or the tank port.

15 Claims, 11 Drawing Sheets

(51) Int. Cl.
  *F16K 31/12*   (2006.01)
  *F16K 31/122*   (2006.01)

(56) References Cited

U.S. PATENT DOCUMENTS

2017/0292541 A1* 10/2017 Miyazoe ................. F16K 27/00
2018/0313459 A1* 11/2018 Lucidera ............. F16K 31/0613
2019/0162324 A1* 5/2019 Tanaka .................... F16K 11/24

* cited by examiner

DIRECTIONAL AND FLOW CONTROL VALVE AND HYDRAULIC SYSTEM

CROSS-REFERENCE TO RELATED APPLICATIONS

This is a National Phase of Application No. PCT/JP2021/037565 filed Oct. 11, 2021, which claims the benefit of Japanese Patent Application No. 2020-172349 filed Oct. 13, 2020. The disclosure of the prior application is hereby incorporated by reference herein in its entirety.

TECHNICAL FIELD

The present disclosure relates to a directional and flow control valve for a hydraulic actuator that moves bi-directionally, and to a hydraulic system including the directional and flow control valve.

BACKGROUND ART

There are cases where a directional and flow control valve including multiple spools is used in a hydraulic actuator that moves bi-directionally. Each spool opens and closes between particular ports, and an opening area between these ports (i.e., a hydraulic liquid flow rate) changes in accordance with a shift amount of the spool.

For example, as shown in FIG. 11, Patent Literature 1 discloses a directional and flow control valve 100 (referred to as an "independent metering valve" in Patent Literature 1), which is located between a hydraulic cylinder 120 and a hydraulic pump 110.

As shown in FIG. 11, the directional and flow control valve 100 includes a pump port 101, a pair of supply/discharge ports 102 and 103, and a tank port 104. Further, the directional and flow control valve 100 includes: a first spool 130, which opens and closes between the pump port 101 and the supply/discharge port 102; a second spool 140, which opens and closes between the supply/discharge port 102 and the tank port 104; a third spool 150, which opens and closes between the pump port 101 and the supply/discharge port 103; and a fourth spool 160, which opens and closes between the supply/discharge port 103 and the tank port 104. According to this configuration, whichever direction the hydraulic cylinder 120 moves in, independent metering control can be performed on the meter-in side or the meter-out side.

CITATION LIST

Patent Literature

PTL 1: Japanese Laid-Open Patent Application Publication No. H11-241702

SUMMARY OF INVENTION

Technical Problem

Patent Literature 1 mentions "electro-hydraulic displacement control" in relation to the first to fourth spools 130 to 160. This appears to mean that electrical signals are converted into pilot pressures, and the spools are displaced by the respective pilot pressures. Generally speaking, solenoid proportional valves are used in such a configuration. That is, the directional and flow control valve 100 of Patent Literature 1 requires four solenoid proportional valves. These solenoid proportional valves may be incorporated in the directional and flow control valve 100, or may be connected to the directional and flow control valve 100 by piping.

Since four spools are used in the directional and flow control valve 100 of Patent Literature 1, there is a desire to reduce the number of spools. In this respect, it is conceivable to integrate the first spool 130 and the second spool 140 together, and also integrate the third spool 150 and the fourth spool 160 together. With such a configuration, the independent metering control is still performable. However, the number of necessary solenoid proportional valves remains four.

In view of the above, an object of the present disclosure is to provide a directional and flow control valve that is capable of independent metering control with a reduced number of solenoid proportional valves and to provide a hydraulic system including the directional and flow control valve.

Solution to Problem

In order to solve the above-described problems, a directional and flow control valve according to the present disclosure includes: a housing with a pump port, a first supply/discharge port, a second supply/discharge port, and a tank port, the housing including therein a first pilot chamber, a second pilot chamber, and a third pilot chamber; a first spool including a first end surface facing the first pilot chamber and a second end surface facing the third pilot chamber, wherein the first spool blocks the first supply/discharge port from both the pump port and the tank port, or brings the first supply/discharge port into communication with one of the pump port or the tank port; and a second spool independent of the first spool, the second spool including a first end surface facing the second pilot chamber and a second end surface facing the third pilot chamber, wherein the second spool blocks the second supply/discharge port from both the pump port and the tank port, or brings the second supply/discharge port into communication with the other one of the pump port or the tank port.

According to the above configuration, by using the two spools that are the first spool and the second spool, the hydraulic actuator connected to the first supply/discharge port and the second supply/discharge port can be moved bi-directionally. Since the first spool and the second spool are independent of each other, the first spool can be shifted in accordance with a difference between the pressure of the first pilot chamber and the pressure of the third pilot chamber, and also, the second spool can be shifted in accordance with a difference between the pressure of the second pilot chamber and the pressure of the third pilot chamber. Accordingly, whichever direction the hydraulic actuator moves in, independent metering control can be performed on the meter-in side or the meter-out side. Moreover, since the number of pilot chambers is three, a necessary number of solenoid proportional valves can be reduced to three.

A hydraulic system according to the present disclosure includes: the above directional and flow control valve; a hydraulic pump connected to the pump port of the directional and flow control valve; a hydraulic actuator connected to the first supply/discharge port and the second supply/discharge port of the directional and flow control valve, wherein the hydraulic actuator moves in a first direction and a second direction; a first solenoid proportional valve that adjusts a pressure of the first pilot chamber of the directional and flow control valve; a second solenoid proportional valve that adjusts a pressure of the second pilot chamber of the directional and flow control valve; a third solenoid proportional valve that adjusts a pressure of the third pilot chamber of the directional and flow control valve; and control circuitry that controls the first solenoid proportional valve, the second solenoid proportional valve, and the third solenoid proportional valve.

The above configuration makes it possible to perform independent metering control by using three solenoid proportional valves for one hydraulic actuator.

Advantageous Effects of Invention

The present disclosure provides a directional and flow control valve that is capable of independent metering control with a reduced number of solenoid proportional valves.

DESCRIPTION OF EMBODIMENTS

Figure 1:
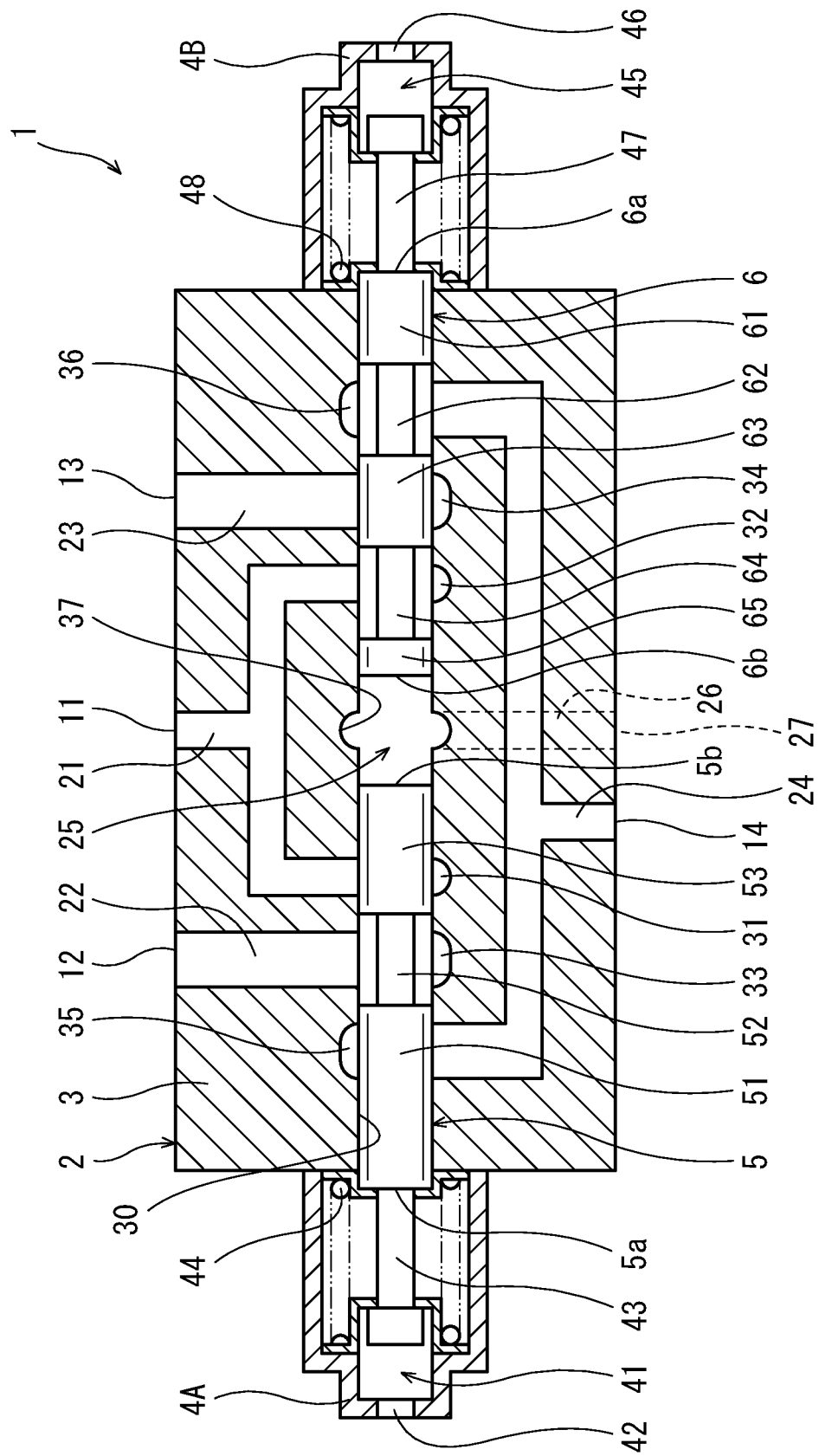
FIG. 1 is a sectional view of a directional and flow control valve according to one embodiment.
Figure 2:
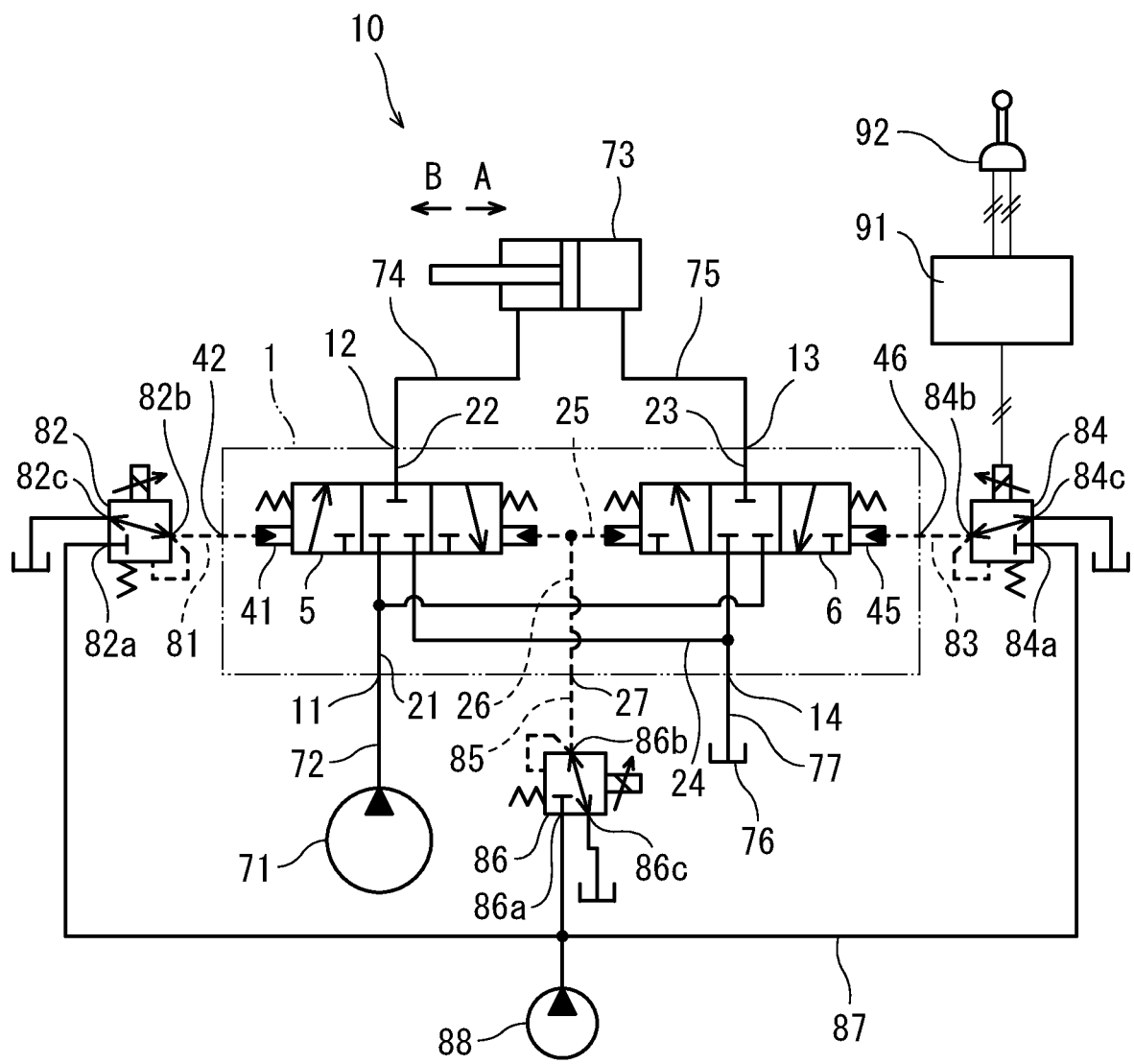
FIG. 2 shows a schematic configuration of a hydraulic system including the directional and flow control valve of FIG. 1.

FIG. 1 shows a directional and flow control valve 1 according to one embodiment, and FIG. 2 shows a hydraulic system 10 including the directional and flow control valve 1.

As shown in FIG. 2, the directional and flow control valve 1 is located between a hydraulic actuator 73 and a hydraulic pump 71. The hydraulic actuator 73 moves in a first direction A and a second direction B. In the example shown in FIG. 2, the hydraulic actuator 73 is a single-rod hydraulic cylinder; the first direction A is a retracting direction; and the second direction B is an extending direction. However, contrary to the present embodiment, the first direction A may be the extending direction, and the second direction B may be the retracting direction. Alternatively, the hydraulic actuator may be a double-rod hydraulic cylinder, or may be a hydraulic motor.

Specifically, as shown in FIG. 1, the directional and flow control valve 1 includes: a housing 2; and a first spool 5 and a second spool 6, which are slidably held by the housing 2. The first spool 5 and the second spool 6 are independent of each other.

The housing 2 includes, on its surface, a pump port 11, a first supply/discharge port 12, a second supply/discharge port 13, and a tank port 14. The housing 2 further includes, on its surface, a first pilot port 42, a second pilot port 46, and a third pilot port 27. Still further, the housing 2 includes therein a first pilot chamber 41, a second pilot chamber 45, and a third pilot chamber 25.

In the present embodiment, the housing 2 includes: a rectangular parallelepiped housing body 3; and a first cover 4A and a second cover 4B, which are mounted to both side surfaces of the housing body 3, respectively. Each of the first cover 4A and the second cover 4B has a container shape. The first pilot chamber 41 is formed as a result of an opening of the first cover 4A being sealed by a side surface of the housing body 3, and the second pilot chamber 45 is formed as a result of an opening of the second cover 4B being sealed by a side surface of the housing body 3. However, the configuration of the housing 2 is not limited to this example, but is modifiable as necessary.

In the present embodiment, the housing body 3 is a single block. Alternatively, the housing body 3 may be made up of multiple blocks. The housing body 3 includes a through-hole 30, which straddles the first pilot chamber 41 and the second pilot chamber 45. The through-hole 30 slidably receives therein the first spool 5 and the second spool 6. In other words, the first spool 5 and the second spool 6 are located coaxially. The aforementioned third pilot chamber 25 is a part of the inside of the through-hole 30 between the first spool 5 and the second spool 6.

Specifically, the first spool 5 includes a first end surface 5a facing the first pilot chamber 41 and a second end surface 5b facing the third pilot chamber 25. Similarly, the second spool 6 includes a first end surface 6a facing the second pilot chamber 45 and a second end surface 6b facing the third pilot chamber 25.

The first spool 5 shifts among a neutral position, a first position, and a second position. When the first spool 5 is in the neutral position, the first spool 5 blocks the first supply/discharge port 12 from both the pump port 11 and the tank port 14. When the first spool 5 is in the first position (see FIG. 3), the first spool 5 brings the first supply/discharge port 12 into communication with the pump port 11 while blocking the first supply/discharge port 12 from the tank port 14. When the first spool 5 is in the second position (see FIG. 4), the first spool 5 brings the first supply/discharge port 12 into communication with the tank port 14 while blocking the first supply/discharge port 12 from the pump port 11.

The second spool 6 shifts among a neutral position, a first position, and a second position. When the second spool 6 is in the neutral position, the second spool 6 blocks the second supply/discharge port 13 from both the pump port 11 and the tank port 14. When the second spool 6 is in the first position (see FIG. 3), the second spool 6 brings the second supply/discharge port 13 into communication with the tank port 14 while blocking the second supply/discharge port 13 from the pump port 11. When the second spool 6 is in the second position (see FIG. 4), the second spool 6 brings the second supply/discharge port 13 into communication with the pump port 11 while blocking the second supply/discharge port 13 from the tank port 14.

That is, when both the first spool 5 and the second spool 6 are in the first position or the second position, the first spool 5 brings the first supply/discharge port 12 into communication with one of the tank port 14 or the pump port 11, and the second spool 6 brings the second supply/discharge port 13 into communication with the other one of the tank port 14 or the pump port 11.

To be more specific, the housing body 3 includes a first flow-in annular groove 31, a first middle annular groove 33, and a first flow-out annular groove 35, which are located in a region overlapping the first spool 5 and are recessed radially outward from the through-hole 30. The first flow-in annular groove 31, the first middle annular groove 33, and the first flow-out annular groove 35 are sequentially located in this order from the middle of the through-hole 30 toward the outer side. The housing body 3 further includes: a pump passage 21, which connects the first flow-in annular groove 31 to the pump port 11; a supply/discharge passage 22, which connects the first middle annular groove 33 to the first supply/discharge port 12; and a tank passage 24, which connects the first flow-out annular groove 35 to the tank port 14.

The first spool 5 includes: a first land 53, which forms the second end surface 5b and which opens and closes the first flow-in annular groove 31; a second land 51, which forms the first end surface 5a and which opens and closes the first flow-out annular groove 35; and a smaller-diameter portion 52, which couples the first land 53 and the second land 51. As shown in FIG. 1, when the first spool 5 is in the neutral position, the first land 53 closes the first flow-in annular groove 31 and the second land 51 closes the first flow-out annular groove 35.

Figure 3:
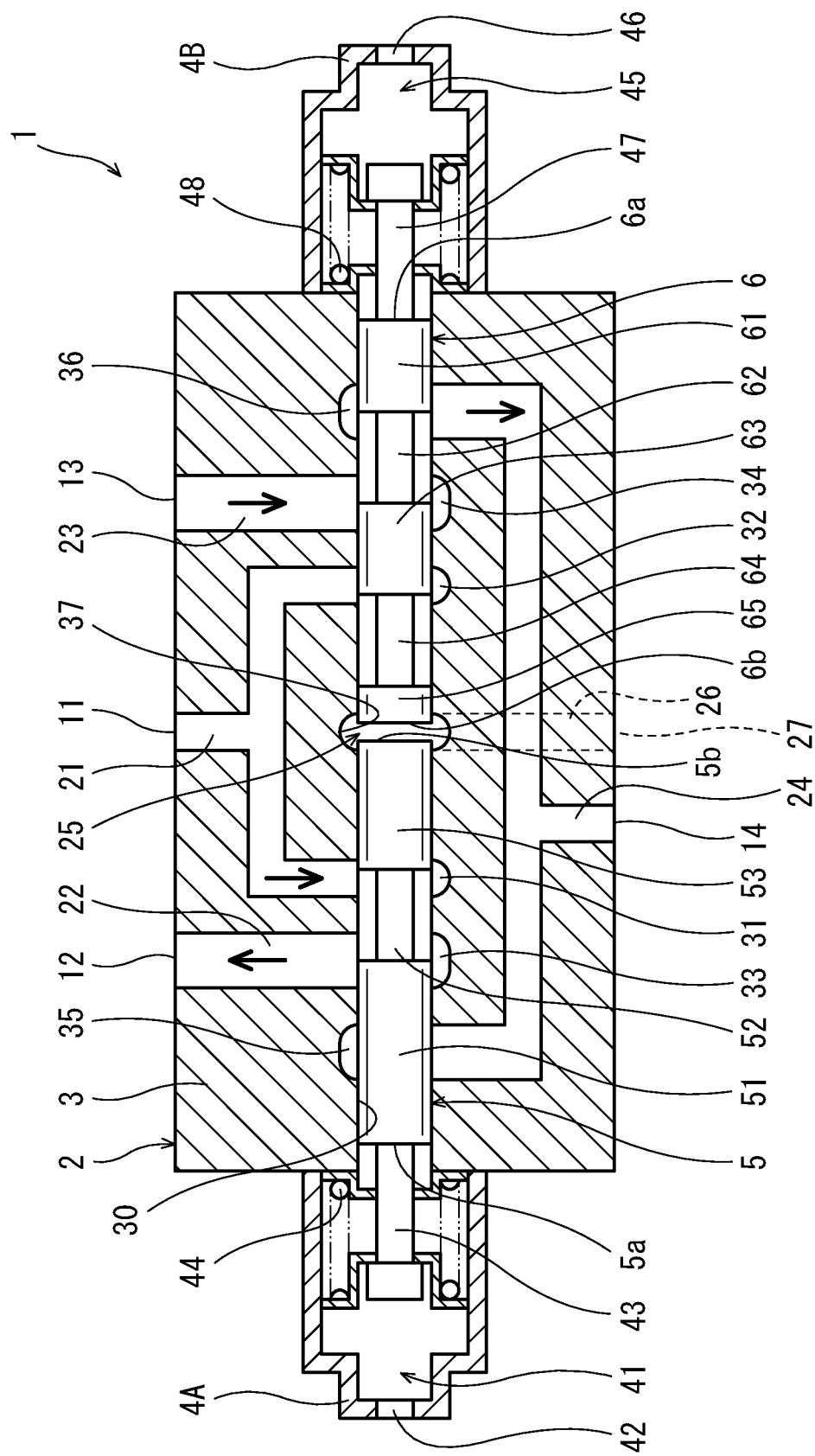
FIG. 3 shows motion of the directional and flow control valve of FIG. 1 at the time of moving a hydraulic actuator in a first direction.
Figure 4:
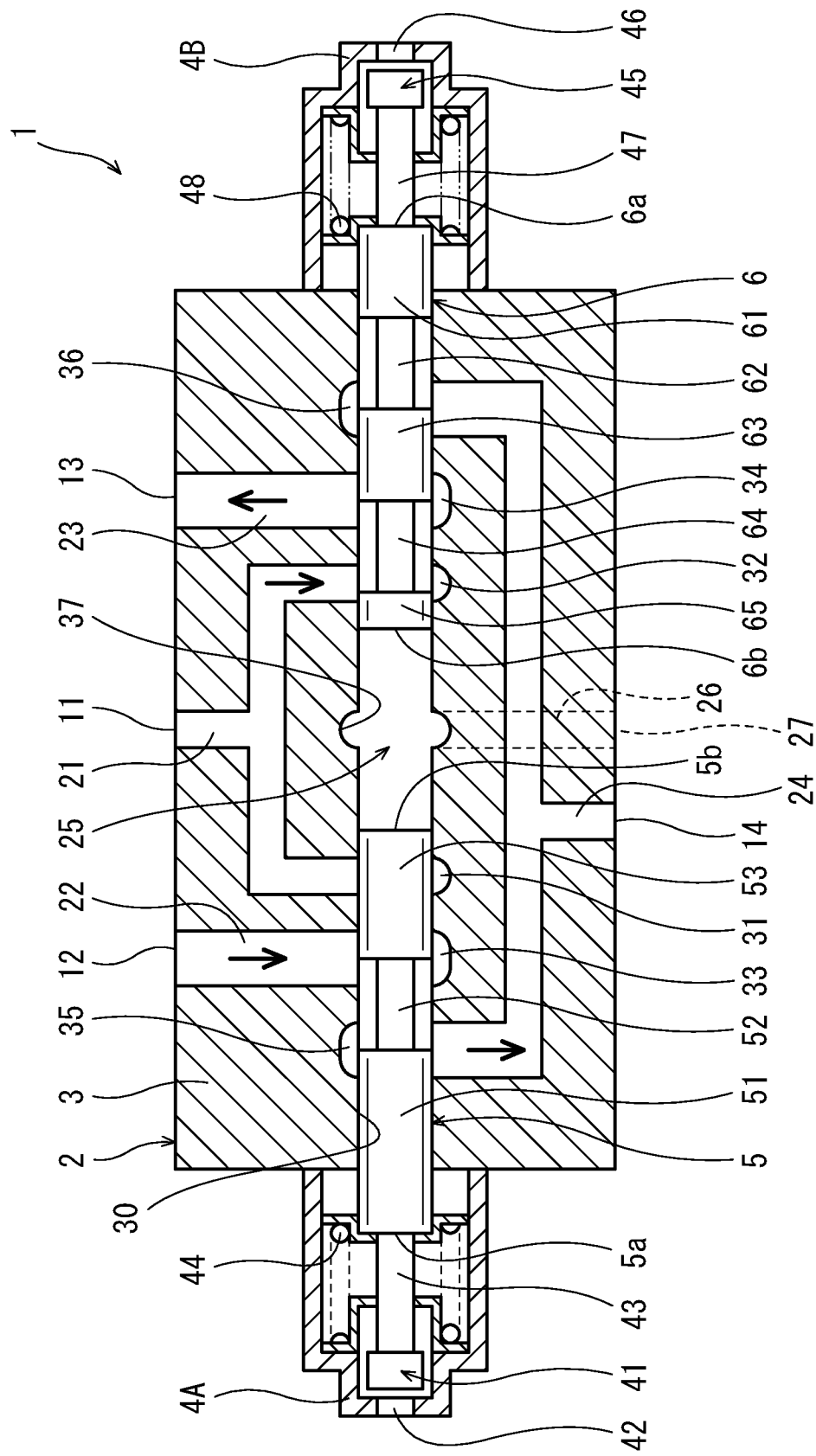
FIG. 4 shows motion of the directional and flow control valve of FIG. 1 at the time of moving the hydraulic actuator in a second direction.

When the first spool 5 shifts from the neutral position toward the second spool 6, the first land 53 opens the first flow-in annular groove 31, and the first flow-in annular groove 31 is brought into communication with the first middle annular groove 33 as shown in FIG. 3. This is the first spool 5 being in the first position. On the other hand, when the first spool 5 shifts from the neutral position in a direction away from the second spool 6, the second land 51 opens the first flow-out annular groove 35, and the first flow-out annular groove 35 is brought into communication with the first middle annular groove 33 as shown in FIG. 4. This is the first spool 5 being in the second position.

The housing body 3 further includes a second flow-in annular groove 32, a second middle annular groove 34, and a second flow-out annular groove 36, which are located in a region overlapping the second spool 6 and are recessed radially outward from the through-hole 30. The second flow-in annular groove 32, the second middle annular groove 34, and the second flow-out annular groove 36 are sequentially located in this order from the middle of the through-hole 30 toward the outer side. That is, the second flow-in annular groove 32 and the above-described first flow-in annular groove 31 are positioned at both sides of the third pilot chamber 25, respectively. Also, the second middle annular groove 34 and the above-described first middle annular groove 33, and the second flow-out annular groove 36 and the above-described first flow-out annular groove 35, are positioned at the outer sides of the first flow-in annular groove 31 and the second flow-in annular groove 32. Further, the first middle annular groove 33 and the first flow-out annular groove 35 are positioned at the opposite side of the first flow-in annular groove 31 from the second flow-in annular groove 32, and the second middle annular groove 34 and the second flow-out annular groove 36 are positioned at the opposite side of the second flow-in annular groove 32 from the first flow-in annular groove 31.

The above-described pump passage 21 connects not only the first flow-in annular groove 31 but also the second flow-in annular groove 32 to the pump port 11. The above-described tank passage 24 connects not only the first flow-out annular groove 35 but also the second flow-out annular groove 36 to the tank port 14. The housing body 3 further includes a supply/discharge passage 23, which connects the second middle annular groove 34 to the second supply/discharge port 13.

The second spool 6 includes: a first land 65, which forms the second end surface 6b and whose position is shifted toward the middle of the through-hole 30 from the second flow-in annular groove 32; a second land 63, which opens and closes the second middle annular groove 34; and a third land 61, which forms the first end surface 6a and whose position is shifted toward the outer side of the through-hole 30 from the second flow-out annular groove 36. The second spool 6 further includes: a first smaller-diameter portion 64, which couples the first land 65 and the second land 63; and a second smaller-diameter portion 62, which couples the second land 63 and the third land 61. As shown in FIG. 1, when the second spool 6 is in the neutral position, the second land 63 closes the second middle annular groove 34.

When the second spool 6 shifts from the neutral position toward the first spool 5, the second land 63 opens the second middle annular groove 34, and the second middle annular groove 34 is brought into communication with the second flow-out annular groove 36 as shown in FIG. 3. This is the second spool 6 being in the first position. On the other hand, when the second spool 6 shifts from the neutral position in a direction away from the first spool 5, the second land 63 opens the second middle annular groove 34, and the second middle annular groove 34 is brought into communication with the second flow-in annular groove 32 as shown in FIG. 4. This is the second spool 6 being in the second position.

The shapes of the first spool 5 and the second spool 6 shown in FIG. 1 are merely one example. The shapes of the first spool 5 and the second spool 6 are modifiable as necessary.

The housing body 3 further includes a middle annular groove 37, which is, at a position between the first spool 5 and the second spool 6 (in the present embodiment, at the middle of the through-hole 30), recessed radially outward from the through-hole 30. The housing body 3 further includes a pilot passage 26, which connects the middle annular groove 37 to the aforementioned third pilot port 27. That is, the pilot passage 26 is open to the middle annular groove 37.

In the above-described first pilot chamber 41, there is a first spring 44, which applies to the first spool 5 urging force to keep the first spool 5 in the neutral position. The first spring 44 directly urges the first spool 5 toward the second spool 6 via a spring seat. A headed rod 43 is mounted to the first end surface 5a of the first spool 5, and the first spring 44 urges the first spool 5 in a direction away from the second spool 6 via a spring seat and the headed rod 43. With this configuration, even in a case where the directional and flow control valve 1 is set such that the axial direction of the through-hole 30 is the vertical direction, a deviation of the neutral position of the first spool 5 due to its own weight can be prevented.

In the present embodiment, the first cover 4A includes the first pilot port 42, which communicates with the first pilot chamber 41. Alternatively, the first pilot port 42 may be included in the housing body 3, and the housing body 3 may include a pilot passage that connects the first pilot chamber 41 to the first pilot port 42.

Similarly, in the second pilot chamber 45, there is a second spring 48, which applies to the second spool 6 urging force to keep the second spool 6 in the neutral position. The second spring 48 directly urges the second spool 6 toward the first spool 5 via a spring seat. A headed rod 47 is mounted to the first end surface 6a of the second spool 6, and the second spring 48 urges the second spool 6 in a direction away from the first spool 5 via a spring seat and the headed rod 47. With this configuration, even in a case where the directional and flow control valve 1 is set such that the axial direction of the through-hole 30 is the vertical direction, a deviation of the neutral position of the second spool 6 due to its own weight can be prevented.

The configuration of the first spring 44 and the configuration of the second spring 48 are the same as each other. That is, the urging force that the first spring 44 applies to the first spool 5, and the urging force that the second spring 48 applies to the second spool 6, are equal to each other.

In the present embodiment, the second cover 4B includes the second pilot port 46, which communicates with the second pilot chamber 45. Alternatively, the second pilot port 46 may be included in the housing body 3, and the housing body 3 may include a pilot passage that connects the second pilot chamber 45 to the second pilot port 46.

As described above, in the directional and flow control valve 1 of the present embodiment, by using the two spools that are the first spool 5 and the second spool 6, the hydraulic actuator 73 connected to the first supply/discharge port 12 and the second supply/discharge port 13 can be moved bi-directionally. Since the first spool 5 and the second spool 6 are independent of each other, the first spool 5 can be shifted in accordance with a difference between the pressure of the first pilot chamber 41 and the pressure of the third pilot chamber 25, and also, the second spool 6 can be shifted in accordance with a difference between the pressure of the second pilot chamber 45 and the pressure of the third pilot chamber 25. Accordingly, whichever direction the hydraulic actuator 73 moves in, independent metering control can be performed on the meter-in side or the meter-out side. Moreover, since the number of pilot chambers is three, a necessary number of solenoid proportional valves can be reduced to three.

Furthermore, since the pilot passage 26 communicates with the third pilot chamber 25 via the middle annular groove 37, even in a case where the first spool 5 and the second spool 6 become adjacent to each other (e.g., a case where the distance between the second end surface 5b of the first spool 5 and the second end surface 6b of the second spool 6 becomes less than the diameter of the pilot passage 26), the supply and discharge of the hydraulic oil to and from the third pilot chamber 25 through the pilot passage 26 can be performed smoothly.

Next, with reference to FIG. 2, the hydraulic system 10 including the directional and flow control valve 1 is described in detail. The pump port 11 of the directional and flow control valve 1 is connected to the hydraulic pump 71 by a pump line 72, and the tank port 14 of the directional and flow control valve 1 is connected to a tank 76 by a tank line 77. Although not illustrated, a relief line is branched off from the pump line 72, and a relief valve located on the relief line keeps the delivery pressure of the hydraulic pump 71 to less than or equal to a predetermined value. The first supply/discharge port 12 and the second supply/discharge port 13 of the directional and flow control valve 1 are connected to the hydraulic actuator 73 by a pair of supply/discharge lines 74 and 75, respectively.

The first pilot port 42 of the directional and flow control valve 1 is connected to a first solenoid proportional valve 82 via a pilot line 81. The second pilot port 46 is connected to a second solenoid proportional valve 84 via a pilot line 83.

The third pilot port 27 is connected to a third solenoid proportional valve 86 via a pilot line 85. The first solenoid proportional valve 82 adjusts the pressure of the first pilot chamber 41. The second solenoid proportional valve 84 adjusts the pressure of the second pilot chamber 45. The third solenoid proportional valve 86 adjusts the pressure of the third pilot chamber 25.

The first solenoid proportional valve 82, the second solenoid proportional valve 84, and the third solenoid proportional valve 86 are connected to a hydraulic pump 88 by a primary pressure line 87. Although not illustrated, a relief line is branched off from the primary pressure line 87, and a relief valve located on the relief line keeps the delivery pressure of the hydraulic pump 88 constant. In a case where the minimum value of the delivery pressure of the hydraulic pump 71 is kept to a relatively high value, it is possible to use the delivery pressure of the hydraulic pump 71 as a primary pressure of each of the first solenoid proportional valve 82, the second solenoid proportional valve 84, and the third solenoid proportional valve 86.

The pilot lines 81, 83, and 85 may be realized by piping. Alternatively, the first to third pilot ports 42, 46, 27 and the pilot lines 81, 83, 85 may be eliminated, and instead, the first solenoid proportional valve 82, the second solenoid proportional valve 84, and the third solenoid proportional valve 86 may be mounted to the housing body 3 of the directional and flow control valve 1, and the first to third solenoid proportional valves 82, 84, and 86 may be connected to the first to third pilot chambers 41, 45, and 25, respectively, by pilot passages included in the housing body 3.

The first solenoid proportional valve 82 includes a primary pressure port 82a, a secondary pressure port 82b, and a tank port 82c. Similarly, the second solenoid proportional valve 84 includes a primary pressure port 84a, a secondary pressure port 84b, and a tank port 84c, and the third solenoid proportional valve 86 includes a primary pressure port 86a, a secondary pressure port 86b, and a tank port 86c.

Each of the first solenoid proportional valve 82, the second solenoid proportional valve 84, and the third solenoid proportional valve 86 outputs a secondary pressure corresponding to a command current. In the present embodiment, each of the first solenoid proportional valve 82, the second solenoid proportional valve 84, and the third solenoid proportional valve 86 is a direct proportional valve that outputs a secondary pressure indicating a positive correlation with a command current. Alternatively, each of the first solenoid proportional valve 82, the second solenoid proportional valve 84, and the third solenoid proportional valve 86 may be an inverse proportional value that outputs a secondary pressure indicating a negative correlation with the command current.

The first solenoid proportional valve 82, the second solenoid proportional valve 84, and the third solenoid proportional valve 86 are controlled by control circuitry 91. FIG. 2 shows only part of signal lines for the purpose of simplifying the drawing. For example, the control circuitry 91 is realized by a computer that includes memories such as a ROM and RAM, a storage such as a HDD or SSD, and a CPU. The CPU executes a program stored in the ROM or the storage.

In the present embodiment, the control circuitry 91 is electrically connected to an operator 92 including an operating lever. The operator 92 receives a first operation and a second operation. The first operation is an operation to move the hydraulic actuator 73 in the first direction A, and the second operation is an operation to move the hydraulic actuator 73 in the second direction B. Upon receiving the first operation, the operator 92 outputs, to the control circuitry 91, a first operation signal corresponding to the magnitude of the first operation. Upon receiving the second operation, the operator 92 outputs, to the control circuitry 91, a second operation signal corresponding to the magnitude of the second operation. Based on the first operation signal or the second operation signal, the control circuitry 91 feeds a command current to any one of the first solenoid proportional valve 82, the second solenoid proportional valve 84, or the third solenoid proportional valve 86.

The control circuitry 91 may be connected to a camera, and based on an image captured by the camera, the control circuitry 91 may determine, for example, whether to move the hydraulic actuator 73 in the first direction A or in the second direction B.

The hydraulic system 10 shown in FIG. 2 makes it possible to perform independent metering control by using three solenoid proportional valves for one hydraulic actuator 73. Hereinafter, a specific control method of the independent metering control is described.

At the time of moving the hydraulic actuator 73 in the first direction A (in the present embodiment, when the operator 92 receives the first operation), the control circuitry 91 feeds no command current to the third solenoid proportional valve 86, but feeds a command current to each of the first solenoid proportional valve 82 and the second solenoid proportional valve 84. Specifically, the control circuitry 91 brings the secondary pressure port 86b of the third solenoid proportional valve 86 into communication with the tank port 86c, causes the first solenoid proportional valve 82 to output a first secondary pressure P1, and causes the second solenoid proportional valve 84 to output a second secondary pressure P2. Each of the first secondary pressure P1 and the second secondary pressure P2 increases in accordance with increase in the magnitude of the first operation signal.

At the time, if the first secondary pressure P1 of the first solenoid proportional valve 82 and the second secondary pressure P2 of the second solenoid proportional valve 84 are the same, no independent metering control is performed. However, if the first secondary pressure P1 of the first solenoid proportional valve 82 and the second secondary pressure P2 of the second solenoid proportional valve 84 are different from each other, meter-in control can be performed by the first solenoid proportional valve 82, and meter-out control can be performed by the second solenoid proportional valve 84. For example, if the first secondary pressure P1 of the first solenoid proportional valve 82 is less than the second secondary pressure P2 of the second solenoid proportional valve 84, meter-in control can be performed by the first solenoid proportional valve 82, whereas if the second secondary pressure P2 of the second solenoid proportional valve 84 is less than the first secondary pressure P1 of the first solenoid proportional valve 82, meter-out control can be performed by the second solenoid proportional valve 84.

At the time of moving the hydraulic actuator 73 in the second direction B (in the present embodiment, when the operator 92 receives the second operation), in the case of performing no independent metering control, the control circuitry 91 feeds no command current to the first solenoid proportional valve 82 and the second solenoid proportional valve 84, but feeds a command current to the third solenoid proportional valve 86. Specifically, the control circuitry 91 brings the secondary pressure port 82b of the first solenoid proportional valve 82 into communication with the tank port 82c, brings the secondary pressure port 84b of the second solenoid proportional valve 84 into communication with the tank port 84c, and causes the third solenoid proportional valve 86 to output a third secondary pressure P3. The third secondary pressure P3 increases in accordance with increase in the magnitude of the second operation signal. Accordingly, the first spool 5 and the second spool 6 can be shifted in the same manner.

On the other hand, in the case of performing independent metering control, the control circuitry 91 feeds a command current to one of the first and second solenoid proportional valves 82 and 84. Specifically, the control circuitry 91 brings the secondary pressure port of one of the first and second solenoid proportional valves 82 and 84 into communication with the tank port, and in a case where the other one of the first and second solenoid proportional valves 82 and 84 is the first solenoid proportional valve 82, the control circuitry 91 causes the first solenoid proportional valve 82 to output the first secondary pressure P1, whereas in a case where the other one of the first and second solenoid proportional valves 82 and 94 is the second solenoid proportional valve 84, the control circuitry 91 causes the second solenoid proportional valve 84 to output the second secondary pressure P2. At the time, the first secondary pressure P1 of the first solenoid proportional valve 82 or the second secondary pressure P2 of the second solenoid proportional valve 84 is less than the third secondary pressure P3 of the third solenoid proportional valve 86.

Thus, at the time of moving the hydraulic actuator 73 in the second direction B, meter-in control or meter-out control can be performed by one of the first and second solenoid proportional valves 82 and 84, or by one of the first and second solenoid proportional valves 82 and 84 and the third solenoid proportional valve 86.

For example, when it is desired to increase the meter-in opening area, the third secondary pressure P3 of the third solenoid proportional valve 86 is increased by $\Delta P$ compared to a case where no independent metering control is performed, and the first secondary pressure P1 of the first solenoid proportional valve 82 is adjusted to $\Delta P$. On the other hand, when it is desired to decrease the meter-in opening area, the second secondary pressure P2 of the second solenoid proportional valve 84 is adjusted to $\Delta P$ while keeping the third secondary pressure P3 of the third solenoid proportional valve 86 to the same secondary pressure as that in a case where no independent metering control is performed.

When it is desired to increase the meter-out opening area, the third secondary pressure P3 of the third solenoid proportional valve 86 is increased by $\Delta P$ compared to a case where no independent metering control is performed, and the second secondary pressure P2 of the second solenoid proportional valve 84 is adjusted to $\Delta P$. On the other hand, when it is desired to decrease the meter-out opening area, the first secondary pressure P1 of the first solenoid proportional valve 82 is adjusted to $\Delta P$ while keeping the third secondary pressure P3 of the third solenoid proportional valve 86 to the same secondary pressure as that in a case where no independent metering control is performed.

(Variations)

The present disclosure is not limited to the above-described embodiment. Various modifications can be made without departing from the scope of the present disclosure.

For example, the first spool 5 and the second spool 6 need not be located coaxially. For example, although not illustrated, two retention holes parallel to each other may be included in the housing body 3, and the first spool 5 and the second spool 6 may be slidably received by the respective retention holes. In this case, the third pilot chamber 25 may have a shape that extends in a direction orthogonal to the axial directions of the respective retention holes, such that the third pilot chamber 25 straddles the two retention holes. However, in a case where the first spool 5 and the second spool 6 are received in the single through-hole 30 as in the above-described embodiment, the structure can be simplified and space saving is achieved, which realizes a low-cost structure.

Figure 5:
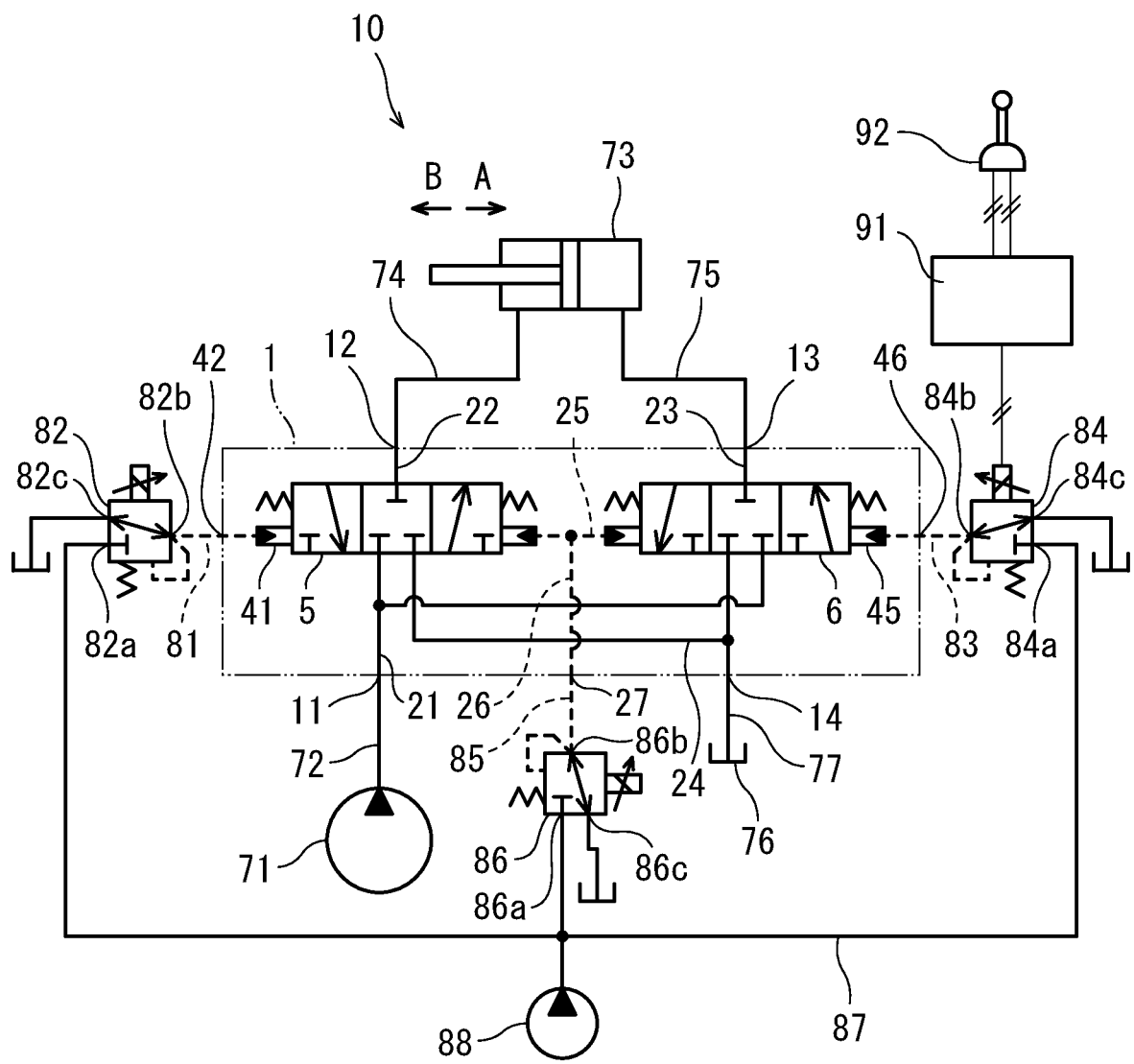
FIG. 5 shows a schematic configuration of the hydraulic system in which the shape of a first spool and the shape of a second spool are switched with each other.

The shape of the first spool 5 and the shape of the second spool 6 may be switched with each other. Specifically, as shown in FIG. 5, the valve symbol of the first spool 5 and the valve symbol of the second spool 6 may be reverse to those shown in FIG. 2. In this case, when the first spool 5 and the second spool 6 shift toward each other, the hydraulic actuator 73, which is a hydraulic cylinder, moves in an extending direction. Therefore, in a case where the extending direction is defined as the first direction, the second spool 6 is the meter-in side, and the first spool 5 is the meter-out side. With this configuration, at the time of moving the hydraulic actuator 73 in the first direction, meter-in control can be performed by the second solenoid proportional valve 84, and meter-out control can be performed by the first solenoid proportional valve 82.

Figure 6:
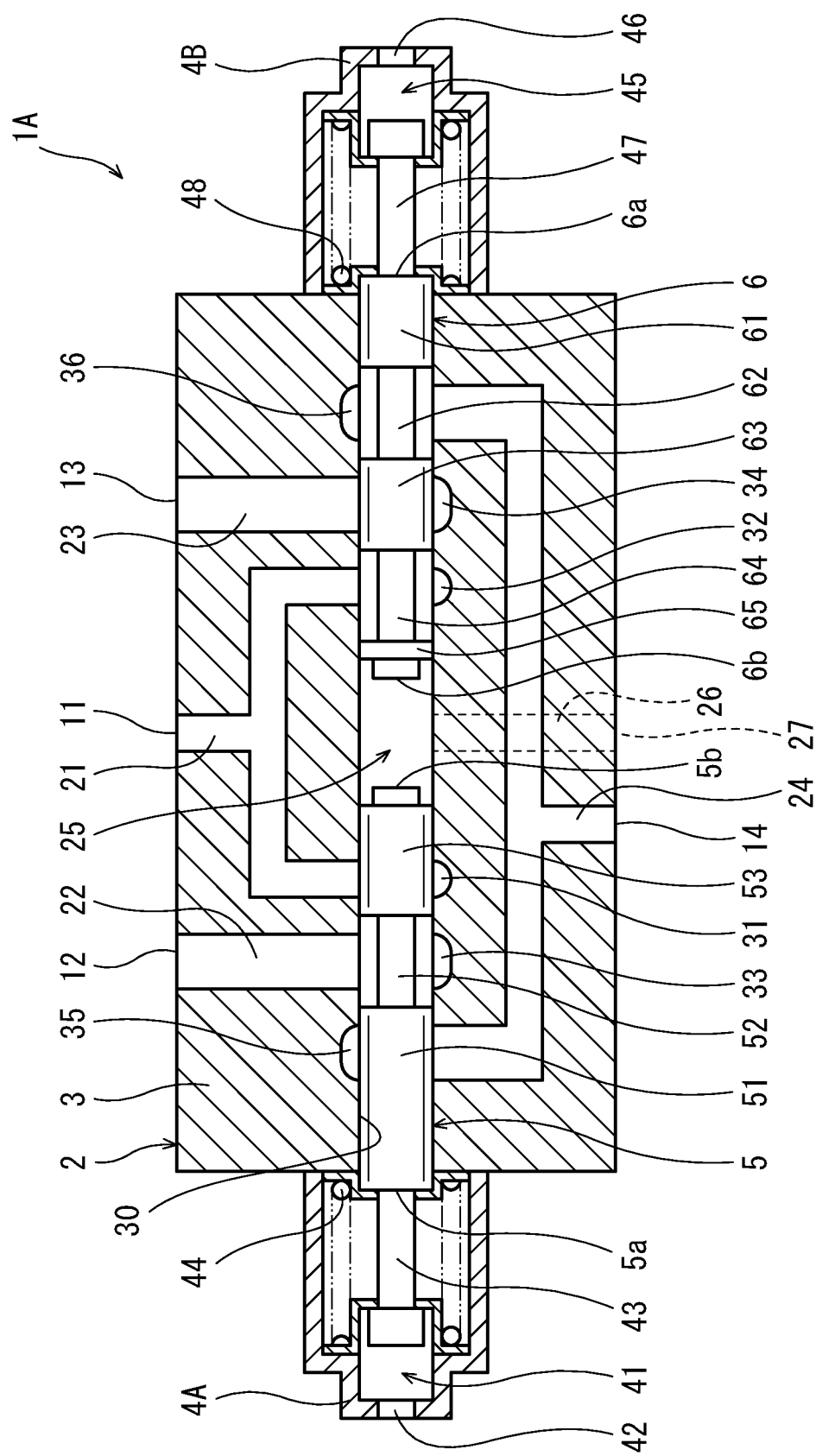
FIG. 6 is a sectional view of a directional and flow control valve according to Variation 1.

As in a directional and flow control valve 1A according to Variation 1 shown in FIG. 6, the middle annular groove 37 may be eliminated, and instead, the pilot passage 26 may be open to the through-hole 30 at a position between the first spool 5 and the second spool 6 (e.g., at the middle of the through-hole 30), and a part of the first land 53 of the first spool 5 adjacent to the second end surface 5b and a part of the first land 65 of the second spool 6 adjacent to the second end surface 6b may be reduced in diameter. Alternatively, only one of the part of the first land 53 of the first spool 5 adjacent to the second end surface 5b or the part of the first land 65 of the second spool 6 adjacent to the second end surface 6b may be reduced in diameter. Also with this configuration, the supply and discharge of the hydraulic oil to and from the third pilot chamber 25 through the pilot passage 26 can be performed smoothly. The reduction in diameter of at least one of the part of the first land 53 of the first spool 5 adjacent to the second end surface 5b or the part of the first land 65 of the second spool 6 adjacent to the second end surface 6b may be combined with the middle annular groove 37.

Incidentally, the pilot pressure introduced into the third pilot chamber 25 (in FIG. 2, the third secondary pressure P3 outputted from the third solenoid proportional valve 86) is a low pressure, whereas the pump pressure introduced into each of the first flow-in annular groove 31 and the second flow-in annular groove 32, which are positioned at both sides of the third pilot chamber 25, is a high pressure. For this reason, there is a desire to prevent leakage of the hydraulic oil from the first flow-in annular groove 31 and the second flow-in annular groove 32 into the third pilot chamber 25.

Figure 7:
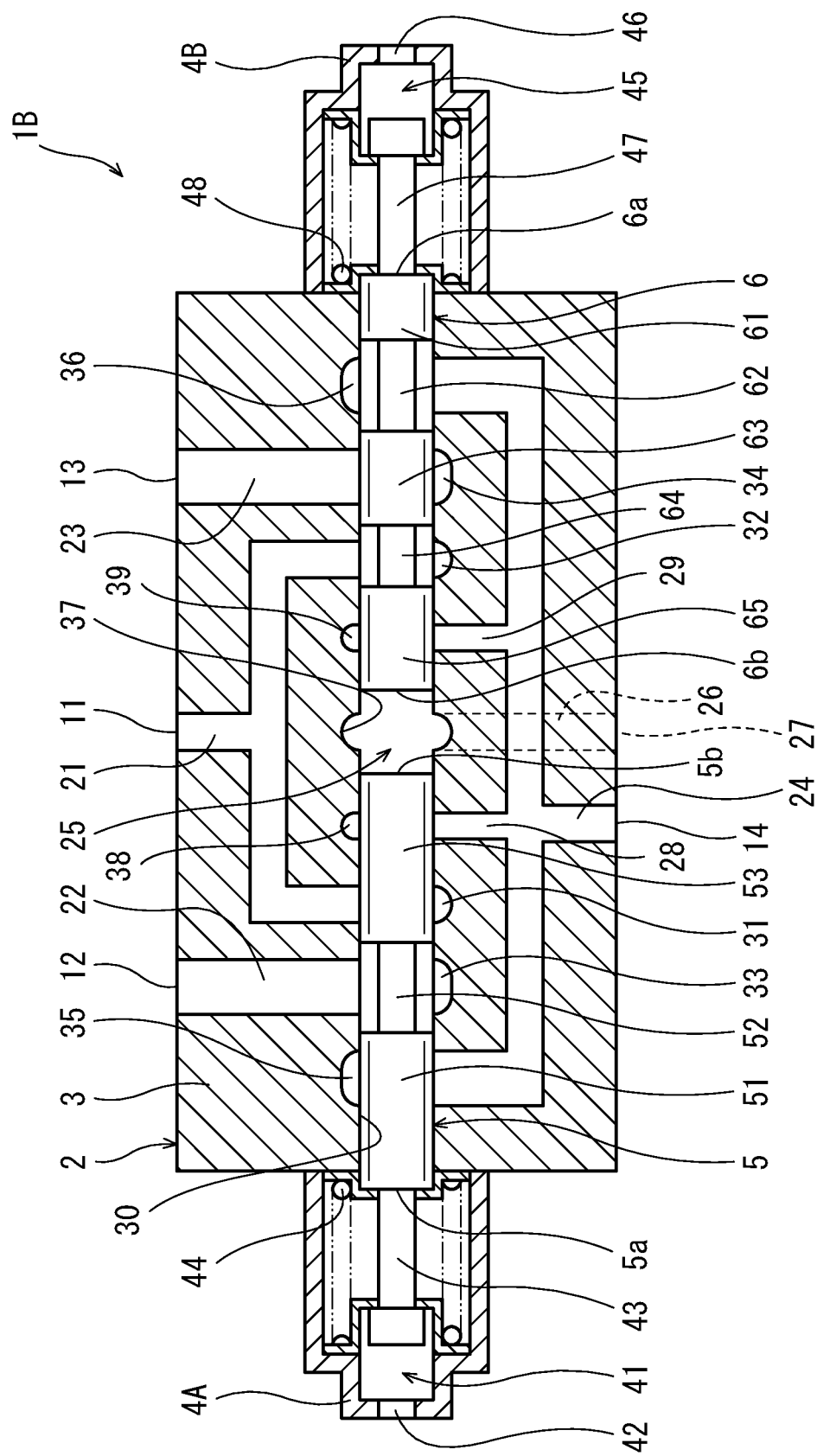
FIG. 7 is a sectional view of a directional and flow control valve according to Variation 2.

For example, as in a directional and flow control valve 1B according to Variation 2 shown in FIG. 7, the housing body 3 may include: a first leakage annular groove 38, which is, at a position between the first flow-in annular groove 31 and the third pilot chamber 25, recessed radially outward from the through-hole 30; and a second leakage annular groove 39, which is, at a position between the second flow-in annular groove 32 and the third pilot chamber 25, recessed radially outward from the through-hole 30. These first leakage annular groove 38 and second leakage annular groove 39 may be connected to the tank passage 24 by a leakage passage 28 and a leakage passage 29, respectively. That is, the first leakage annular groove 38 and the second leakage annular groove 39 are connected to the tank port 14 via the leakage passages 28 and 29 and the tank passage 24. This configuration makes it possible to prevent leakage of the hydraulic oil from the first flow-in annular groove 31 and the second flow-in annular groove 32 into the third pilot chamber 25. Even in a case where only one of the first leakage annular groove 38 or the second leakage annular groove 39 is adopted, this advantageous effect can be obtained at the side where the one of the first leakage annular groove 38 or the second leakage annular groove 39 is adopted.

Figure 8:
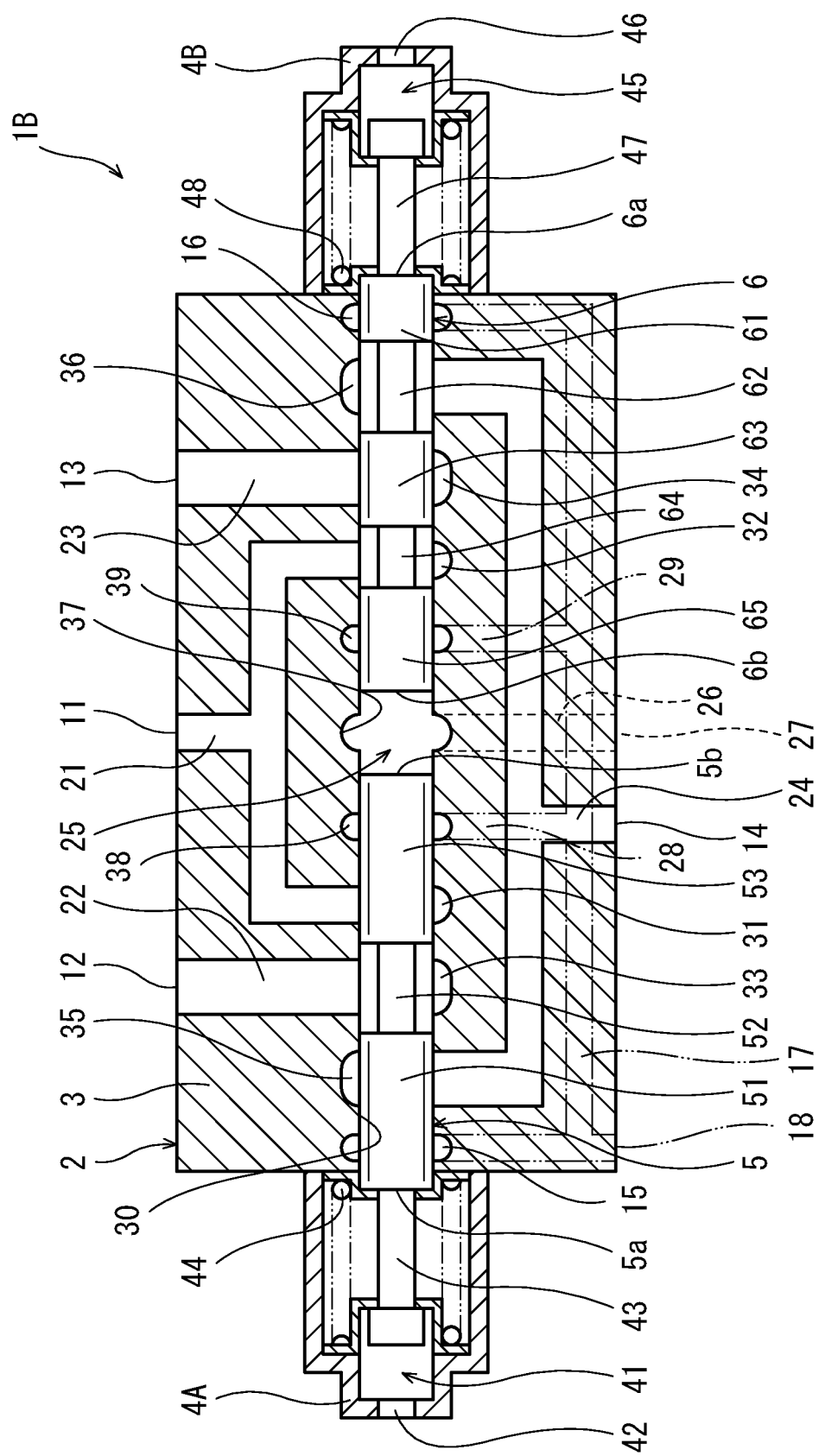
FIG. 8 is a sectional view of the directional and flow control valve as an alternative to Variation 2.

As an alternative to Variation 2, as shown in FIG. 8, in a case where a first drain annular groove 15 and a second drain annular groove 16, which are recessed radially outward from the through-hole 30, are located at the outer side of the first flow-out annular groove 35 and the outer side of the second flow-out annular groove 36, respectively, and the first drain annular groove 15 and the second drain annular groove 16 are connected to a drain port 18 by a drain passage 17, the first leakage annular groove 38 and the second leakage annular groove 39 may be connected to the drain passage 17 by the leakage passage 28 and the leakage passage 29, respectively. Similar to the first middle annular groove 33 and the first flow-in annular groove 35, the first drain annular groove 15 is positioned at the opposite side of the first flow-in annular groove 31 from the second flow-in annular groove 32. Similar to the second middle annular groove 34 and the second flow-out annular groove 36, the second drain annular groove 16 is positioned at the opposite side of the second flow-in annular groove 32 from the first flow-in annular groove 31.

Also with this configuration in which the first leakage annular groove 38 and the second leakage annular groove 39 are connected to the drain passage 17 in the above-described manner, leakage of the hydraulic oil from the first flow-in annular groove 31 and the second flow-in annular groove 32 into the third pilot chamber 25 can be prevented. Even in a case where only one of the first leakage annular groove 38 or the second leakage annular groove 39 is adopted, this advantageous effect can be obtained at the side where the one of the first leakage annular groove 38 or the second leakage annular groove 39 is adopted. The drain passage 17 need not be a drain passage that communicates with the through-hole 30, but may be a drain passage intended for a different use.

Figure 9:
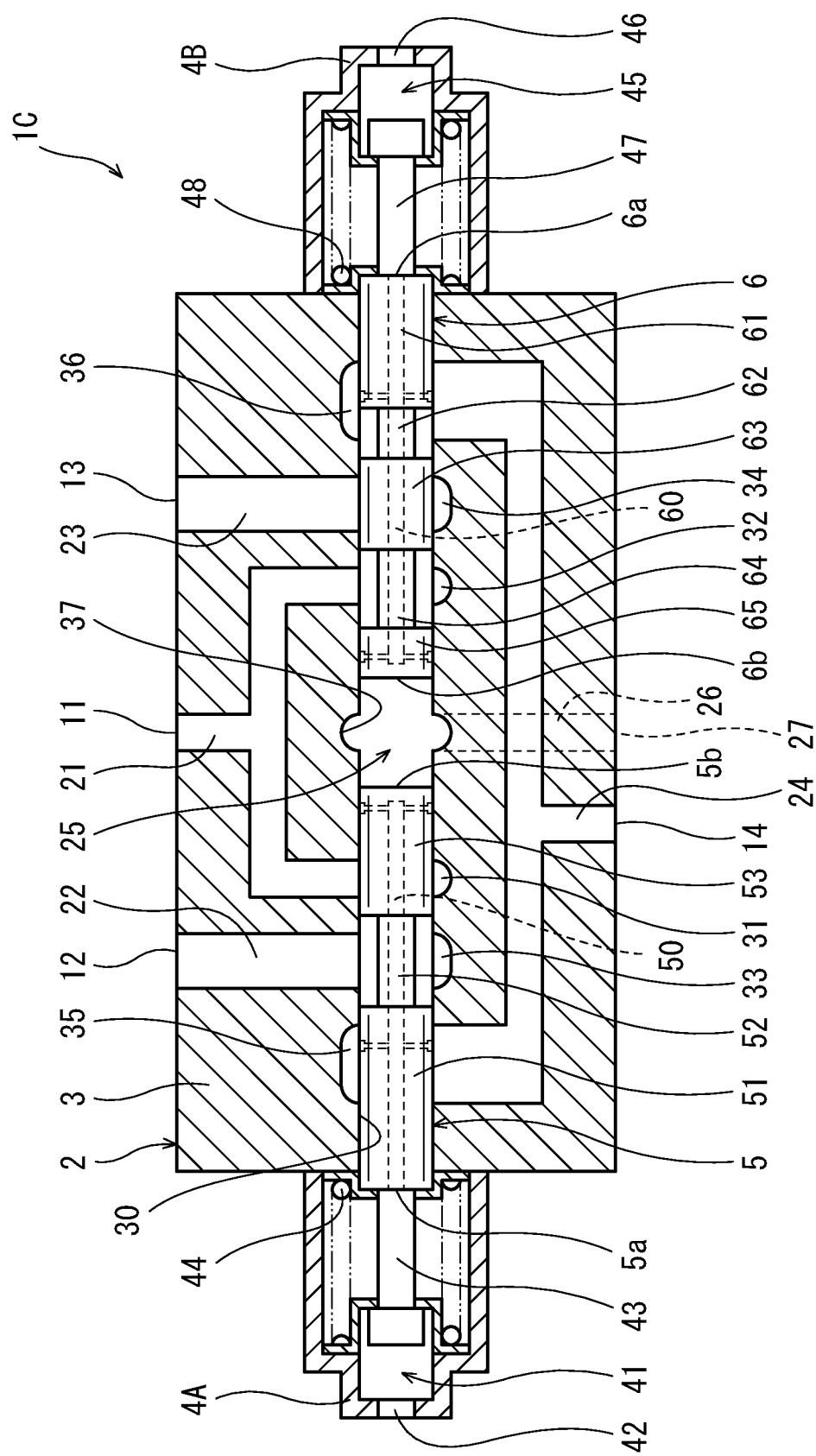
FIG. 9 is a sectional view of a directional and flow control valve according to Variation 3.

Alternatively, as in a directional and flow control valve 1C according to Variation 3 shown in FIG. 9, the first spool 5 may include therein a leakage passage 50, which extends from a position, on the outer peripheral surface of the first land 53, between the first flow-in annular groove 31 and the second end surface 5b to the first flow-out annular groove 35. Similarly, the second spool 6 may include therein a leakage passage 60, which extends from a position, on the outer peripheral surface of the first land 65, between the second flow-in annular groove 32 and the second end surface 6b to the second flow-out annular groove 36. Also with this configuration, leakage of the hydraulic oil from the first flow-in annular groove 31 and the second flow-in annular groove 32 into the third pilot chamber 25 can be prevented. Even in a case where only one of the leakage passages 50 and 60 is adopted, this advantageous effect can be obtained at the side where the one of the leakage passages 50 and 60 is adopted.

In a case where there is the first drain annular groove 15 as shown in FIG. 8, the leakage passage 50 of the first spool 5 may extend from a position on the outer peripheral surface of the first land 53 between the first flow-in annular groove 31 and the second end surface 5b to the first drain annular groove 15. Similarly, in a case where there is the second drain annular groove 16 as shown in FIG. 8, the leakage passage 60 of the second spool 6 may extend from a position on the outer peripheral surface of the first land 65 between the second flow-in annular groove 32 and the second end surface 6b to the second drain annular groove 16.

Further, although not illustrated, the first leakage annular groove 38 shown in FIG. 7 or FIG. 8 may be adopted on the first spool 5 side, and the leakage passage 60 shown in FIG. 9 may be adopted on the second spool 6 side. Alternatively, the first leakage annular groove 38 shown in FIG. 7 or FIG. 8 and the leakage passage 50 shown in FIG. 9 may be both adopted on the first spool 5 side, and the second leakage annular groove 39 shown in FIG. 7 or FIG. 8 and the leakage passage 60 shown in FIG. 9 may be both adopted on the second spool 6 side.

Figure 10:
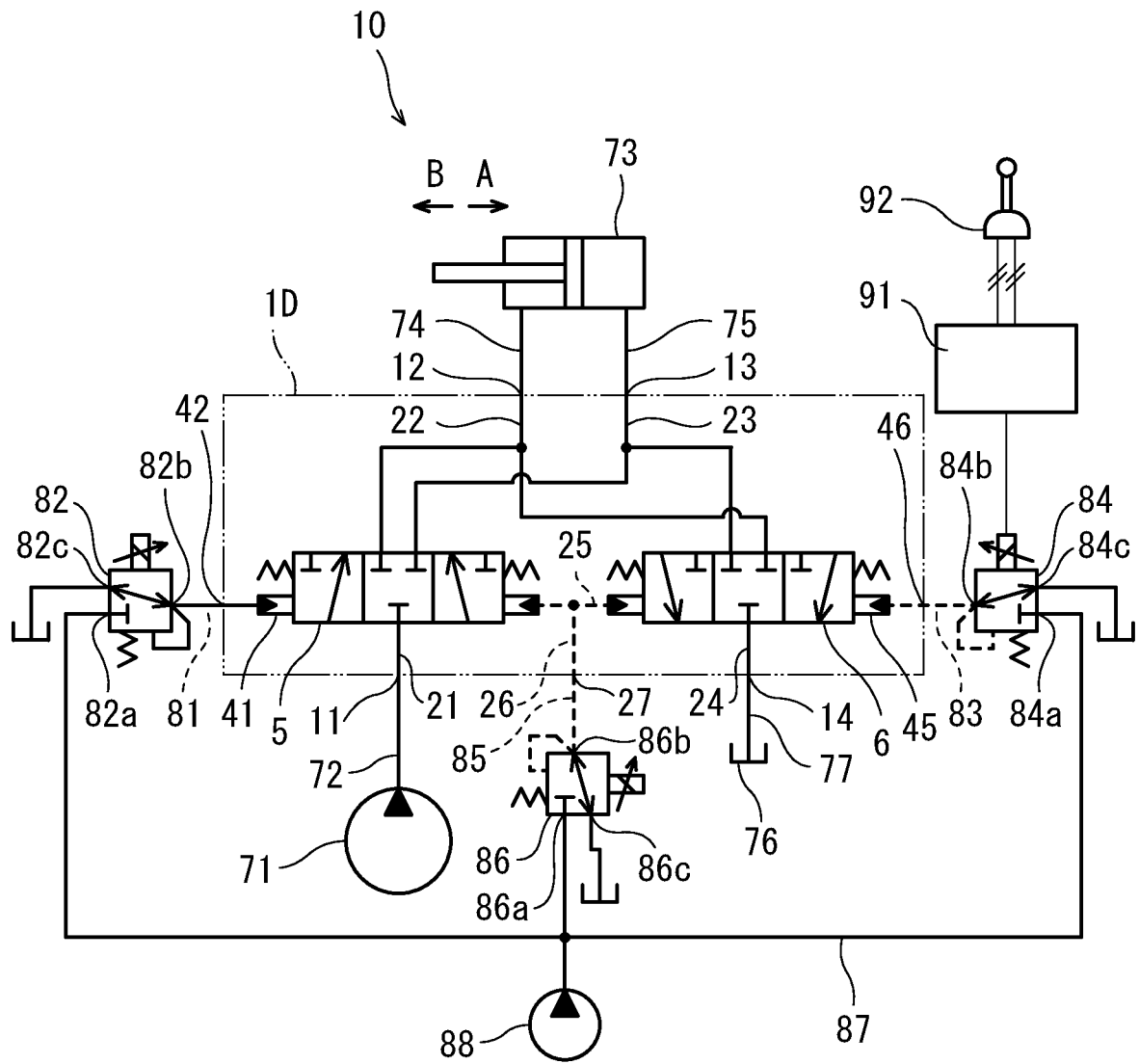
FIG. 10 shows a schematic configuration of the hydraulic system including a directional and flow control valve according to Variation 4.
Figure 11:
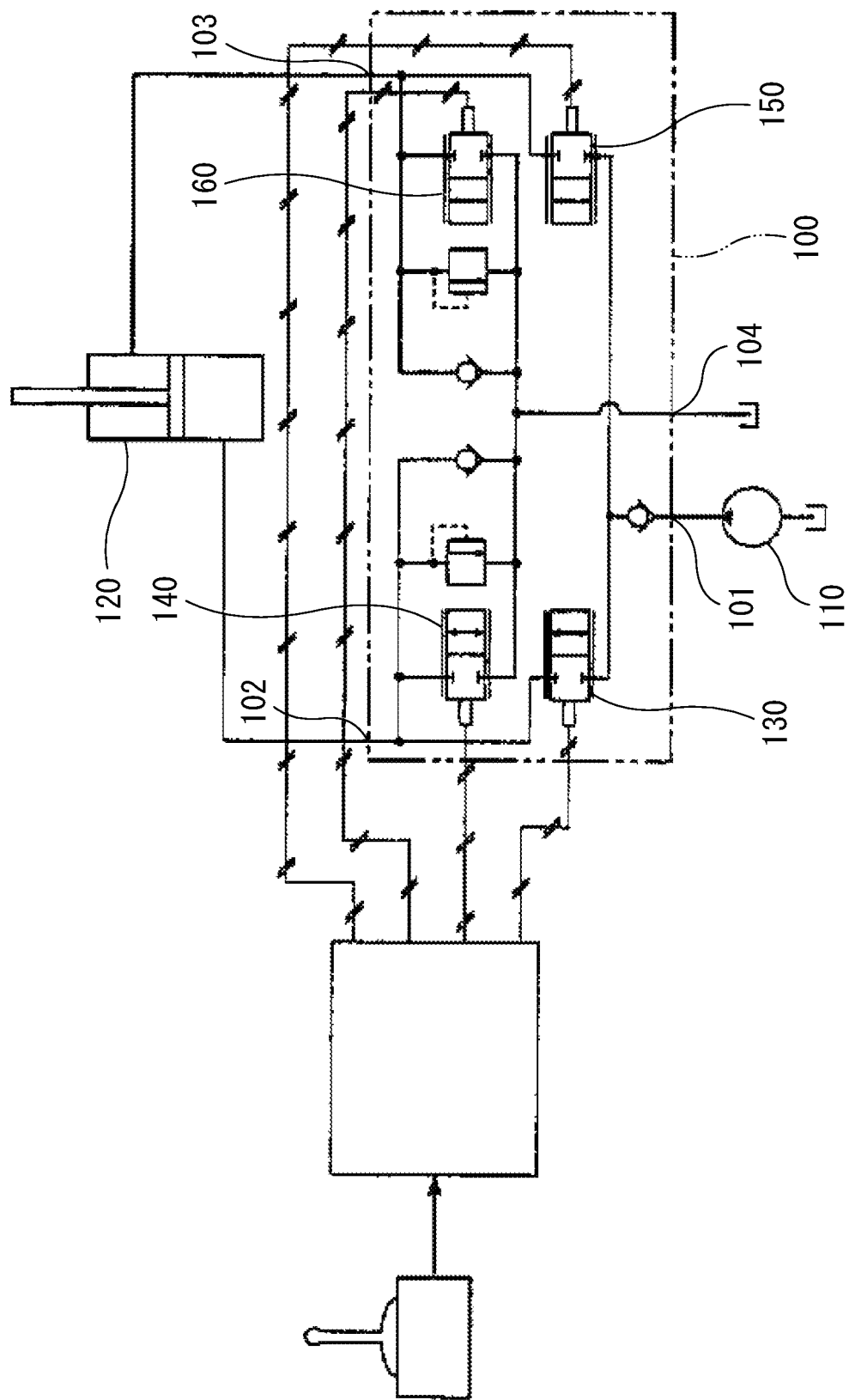
FIG. 11 shows a schematic configuration of a hydraulic system including a conventional directional and flow control valve.

In the above-described embodiment, each of the pump passage 21 and the tank passage 24 branches into two passages toward the through-hole 30. Alternatively, as in a directional and flow control valve 1D according to Variation 4 shown in FIG. 10, each of the pump passage 21 and the tank passage 24 may not branch, but each of the supply/discharge passages 22 and 23 may branch into two passages toward the through-hole 30.

(Summary)

A directional and flow control valve according to the present disclosure includes: a housing with a pump port, a first supply/discharge port, a second supply/discharge port, and a tank port, the housing including therein a first pilot chamber, a second pilot chamber, and a third pilot chamber; a first spool including a first end surface facing the first pilot chamber and a second end surface facing the third pilot chamber, wherein the first spool blocks the first supply/discharge port from both the pump port and the tank port, or brings the first supply/discharge port into communication with one of the pump port or the tank port; and a second spool independent of the first spool, the second spool including a first end surface facing the second pilot chamber and a second end surface facing the third pilot chamber, wherein the second spool blocks the second supply/discharge port from both the pump port and the tank port, or brings the second supply/discharge port into communication with the other one of the pump port or the tank port.

According to the above configuration, by using the two spools that are the first spool and the second spool, the hydraulic actuator connected to the first supply/discharge port and the second supply/discharge port can be moved bi-directionally. Since the first spool and the second spool are independent of each other, the first spool can be shifted in accordance with a difference between the pressure of the first pilot chamber and the pressure of the third pilot chamber, and also, the second spool can be shifted in accordance with a difference between the pressure of the second pilot chamber and the pressure of the third pilot chamber. Accordingly, whichever direction the hydraulic actuator moves in, independent metering control can be performed on the meter-in side or the meter-out side. Moreover, since the number of pilot chambers is three, a necessary number of solenoid proportional valves can be reduced to three.

The housing may include a housing body including a through-hole that slidably receives therein the first spool and the second spool. The third pilot chamber may be a part of an inside of the through-hole between the first spool and the second spool. According to this configuration, since the first spool and the second spool are received in the single through-hole, the structure can be simplified.

For example, the housing body may include a first flow-in annular groove and a second flow-in annular groove that are positioned at both sides of the third pilot chamber, respectively, and are recessed radially outward from the through-hole, and the flow-in annular groove and the second flow-in annular groove may be connected to the pump port. The first spool may include a land that forms the second end surface of the first spool. The second spool may include a land that forms the second end surface of the second spool.

The housing body may include a first leakage annular groove that is, at a position between the first flow-in annular groove and the third pilot chamber, recessed radially outward from the through-hole, and the first leakage annular groove may be connected to the tank port or a drain passage. This configuration makes it possible to prevent leakage of the hydraulic oil from the first flow-in annular groove into the third pilot chamber.

The housing body may include, in addition to the above first leakage annular groove, a second leakage annular groove that is, at a position between the second flow-in annular groove and the third pilot chamber, recessed radially outward from the through-hole, and the second leakage annular groove may be connected to the tank port or the drain passage. This configuration makes it possible to prevent leakage of the hydraulic oil from the second flow-in annular groove into the third pilot chamber.

Alternatively, the housing body may include a second flow-out annular groove, or a second drain annular groove, recessed radially outward from the through-hole and positioned at an opposite side of the second flow-in annular groove from the first flow-in annular groove, the second flow-out annular groove being connected to the tank port. The second spool may include a leakage passage that extends from a position, on an outer peripheral surface of the land of the second spool, between the second flow-in annular groove and the second end surface of the second spool to the second flow-out annular groove or the second drain annular groove. Also with this configuration, leakage of the hydraulic oil from the second flow-in annular groove into the third pilot chamber can be prevented.

The housing body may include either: a first flow-out annular groove and a second flow-out annular groove that are located at an outer side of the first flow-in annular groove and an outer side of the second flow-in annular groove, respectively, and are recessed radially outward from the through-hole, the first flow-out annular groove and the second flow-out annular groove being connected to the tank port; or a first drain annular groove and a second drain annular groove that are located at the outer side of the first flow-in annular groove and the outer side of the second flow-in annular groove, respectively, and are recessed radially outward from the through-hole. The first spool may include a leakage passage that extends from a position, on an outer peripheral surface of the land of the first spool, between the first flow-in annular groove and the second end surface of the first spool to the first flow-out annular groove or the first drain annular groove. The second spool may include a leakage passage that extends from a position, on an outer peripheral surface of the land of the second spool, between the second flow-in annular groove and the second end surface of the second spool to the second flow-out annular groove or the second drain annular groove. Also with this configuration, leakage of the hydraulic oil from the first flow-in annular groove and the second flow-in annular groove into the third pilot chamber can be prevented.

The housing body may include: a middle annular groove that is, at a position between the first spool and the second spool, recessed radially outward from the through-hole; and a pilot passage that is open to the middle annular groove. According to this configuration, the supply and discharge of the hydraulic oil to and from the third pilot chamber through the pilot passage can be performed smoothly.

Alternatively, the housing body may include a pilot passage that is, at a position between the first spool and the second spool, open to the through-hole, and at least one of a part of the land of the first spool adjacent to the second end surface of the first spool, or a part of the land of the second spool adjacent to the second end surface of the second spool, may be reduced in diameter. Also with this configuration, the supply and discharge of the hydraulic oil to and from the third pilot chamber through the pilot passage can be performed smoothly.

For example, in the first pilot chamber, there may be a first spring that applies to the first spool urging force to keep the first spool in a neutral position in which the first spool blocks the first supply/discharge port from both the pump port and the tank port, and in the second pilot chamber, there may be a second spring that applies to the second spool urging force to keep the second spool in a neutral position in which the second spool blocks the second supply/discharge port from both the pump port and the tank port.

A hydraulic system according to the present disclosure includes: the above directional and flow control valve; a hydraulic pump connected to the pump port of the directional and flow control valve; a hydraulic actuator connected to the first supply/discharge port and the second supply/discharge port of the directional and flow control valve, wherein the hydraulic actuator moves in a first direction and a second direction; a first solenoid proportional valve that adjusts a pressure of the first pilot chamber of the directional and flow control valve; a second solenoid proportional valve that adjusts a pressure of the second pilot chamber of the directional and flow control valve; a third solenoid proportional valve that adjusts a pressure of the third pilot chamber of the directional and flow control valve; and control circuitry that controls the first solenoid proportional valve, the second solenoid proportional valve, and the third solenoid proportional valve.

The above configuration makes it possible to perform independent metering control by using three solenoid proportional valves for one hydraulic actuator.

For example, at a time of moving the hydraulic actuator in the first direction, the control circuitry may bring a secondary pressure port of the third solenoid proportional valve into communication with the tank port, cause the first solenoid proportional valve to output a first secondary pressure, and cause the second solenoid proportional valve to output a second secondary pressure, and at a time of moving the hydraulic actuator in the second direction, the control circuitry may cause the third solenoid proportional valve to output a third secondary pressure.

At the time of moving the hydraulic actuator in the first direction, the control circuitry may make the first secondary pressure and the second secondary pressure different from each other. According to this configuration, at the time of moving the hydraulic actuator in the first direction, meter-in control can be performed by one of the first and second solenoid proportional valves, and meter-out control can be performed by the other one of the first and second solenoid proportional valves.

At the time of moving the hydraulic actuator in the second direction, the control circuitry may bring a secondary pressure port of the first solenoid proportional valve into communication with the tank port, and bring a secondary pressure port of the second solenoid proportional valve into communication with the tank port. According to this configuration, at the time of moving the hydraulic actuator in the second direction, the first spool and the second spool can be shifted in the same manner.

At the time of moving the hydraulic actuator in the second direction, the control circuitry may bring a secondary pressure port of one of the first and second solenoid proportional valves into communication with the tank port, and in a case where the other one of the first and second solenoid proportional valves is the first solenoid proportional valve, the control circuitry may cause the first solenoid proportional valve to output the first secondary pressure that is less than the third secondary pressure, whereas in a case where the other one of the first and second solenoid proportional valves is the second solenoid proportional valve, the control circuitry may cause the second solenoid proportional valve to output the second secondary pressure that is less than the third secondary pressure. According to this configuration, at the time of moving the hydraulic actuator in the second direction, meter-in control or meter-out control can be performed by one of the first and second solenoid proportional valves, or by one of the first and second solenoid proportional valves and the third solenoid proportional valve.

The invention claimed is:

1. A directional and flow control valve comprising:
   a housing with a pump port, a first supply/discharge port, a second supply/discharge port, and a tank port, the housing including therein a first pilot chamber, a second pilot chamber, and a third pilot chamber;
   a first spool including a first end surface facing the first pilot chamber and a second end surface facing the third pilot chamber, wherein when the first spool is in a neutral position, the first spool blocks the first supply/discharge port from both the pump port and the tank port, and when the first spool shifts from the neutral position, the first spool brings the first supply/discharge port into direct communication with one of the pump port or the tank port; and
   a second spool independent of the first spool, the second spool including a first end surface facing the second pilot chamber and a second end surface facing the third pilot chamber, wherein when the second spool is in a neutral position, the second spool blocks the second supply/discharge port from both the pump port and the tank port, and when the second spool shifts from the neutral position, the second spool brings the second supply/discharge port into direct communication with the other one of the pump port or the tank port.

2. The directional and flow control valve according to claim 1, wherein
   the housing includes a housing body including a through-hole that slidably receives therein the first spool and the second spool, and
   the third pilot chamber is a part of an inside of the through-hole between the first spool and the second spool.

3. The directional and flow control valve according to claim 2, wherein the housing body includes a first flow-in annular groove and a second flow-in annular groove that are positioned at both sides of the third pilot chamber, respectively, and are recessed radially outward from the through-hole, and the first flow-in annular groove and the second flow-in annular groove are connected to the pump port, the first spool includes a land that forms the second end surface of the first spool, and the second spool includes a land that forms the second end surface of the second spool.

4. The directional and flow control valve according to claim 3, wherein
the housing body includes a first leakage annular groove that is, at a position between the first flow-in annular groove and the third pilot chamber, recessed radially outward from the through-hole, and the first leakage annular groove is connected to the tank port or a drain passage.

5. The directional and flow control valve according to claim 4, wherein
the housing body includes a second leakage annular groove that is, at a position between the second flow-in annular groove and the third pilot chamber, recessed radially outward from the through-hole, and the second leakage annular groove is connected to the tank port or the drain passage.

6. The directional and flow control valve according to claim 3, wherein
the housing body includes a second flow-out annular groove, or a second drain annular groove, recessed radially outward from the through-hole and positioned at an opposite side of the second flow-in annular groove from the first flow-in annular groove, the second flow-out annular groove being connected to the tank port, and
the second spool includes a leakage passage that extends from a position, on an outer peripheral surface of the land of the second spool, between the second flow-in annular groove and the second end surface of the second spool to the second flow-out annular groove or the second drain annular groove.

7. The directional and flow control valve according to claim 3, wherein
the housing body includes either:
a first flow-out annular groove and a second flow-out annular groove that are located at an outer side of the first flow-in annular groove and an outer side of the second flow-in annular groove, respectively, and are recessed radially outward from the through-hole, the first flow-out annular groove and the second flow-out annular groove being connected to the tank port; or
a first drain annular groove and a second drain annular groove that are located at the outer side of the first flow-in annular groove and the outer side of the second flow-in annular groove, respectively, and are recessed radially outward from the through-hole,
the first spool includes a leakage passage that extends from a position, on an outer peripheral surface of the land of the first spool, between the first flow-in annular groove and the second end surface of the first spool to the first flow-out annular groove or the first drain annular groove, and
the second spool includes a leakage passage that extends from a position, on an outer peripheral surface of the land of the second spool, between the second flow-in annular groove and the second end surface of the second spool to the second flow-out annular groove or the second drain annular groove.

8. The directional and flow control valve according to claim 2, wherein
the housing body includes:
a middle annular groove that is, at a position between the first spool and the second spool, recessed radially outward from the through-hole; and
a pilot passage that is open to the middle annular groove.

9. The directional and flow control valve according to claim 3, wherein
the housing body includes a pilot passage that is, at a position between the first spool and the second spool, open to the through-hole, and
at least one of a part of the land of the first spool adjacent to the second end surface of the first spool, or a part of the land of the second spool adjacent to the second end surface of the second spool, is reduced in diameter.

10. The directional and flow control valve according to claim 1, wherein in the first pilot chamber, there is a first spring that applies to the first spool urging force to keep the first spool in a neutral position in which the first spool blocks the first supply/discharge port from both the pump port and the tank port, and in the second pilot chamber, there is a second spring that applies to the second spool urging force to keep the second spool in a neutral position in which the second spool blocks the second supply/discharge port from both the pump port and the tank port.

11. A hydraulic system comprising:
a directional and flow control valve including:
a housing with a pump port, a first supply/discharge port, a second supply/discharge port, and a tank port, the housing including therein a first pilot chamber, a second pilot chamber, and a third pilot chamber;
a first spool including a first end surface facing the first pilot chamber and a second end surface facing the third pilot chamber, wherein the first spool blocks the first supply/discharge port from both the pump port and the tank port, or brings the first supply/discharge port into communication with one of the pump port or the tank port; and
a second spool independent of the first spool, the second spool including a first end surface facing the second pilot chamber and a second end surface facing the third pilot chamber, wherein the second spool blocks the second supply/discharge port from both the pump port and the tank port, or brings the second supply/discharge port into communication with the other one of the pump port or the tank port,
a hydraulic pump connected to the pump port of the directional and flow control valve;
a hydraulic actuator connected to the first supply/discharge port and the second supply/discharge port of the directional and flow control valve, wherein the hydraulic actuator moves in a first direction and a second direction;
a first solenoid proportional valve that adjusts a pressure of the first pilot chamber of the directional and flow control valve;
a second solenoid proportional valve that adjusts a pressure of the second pilot chamber of the directional and flow control valve;
a third solenoid proportional valve that adjusts a pressure of the third pilot chamber of the directional and flow control valve; and
control circuitry that controls the first solenoid proportional valve, the second solenoid proportional valve, and the third solenoid proportional valve.

12. The hydraulic system according to claim 11, wherein
at a time of moving the hydraulic actuator in the first direction, the control circuitry brings a secondary pressure port of the third solenoid proportional valve into communication with the tank port, causes the first solenoid proportional valve to output a first secondary pressure, and causes the second solenoid proportional valve to output a second secondary pressure, and at a time of moving the hydraulic actuator in the second direction, the control circuitry causes the third solenoid proportional valve to output a third secondary pressure.

13. The hydraulic system according to claim 12, wherein at the time of moving the hydraulic actuator in the first direction, the control circuitry makes the first secondary pressure and the second secondary pressure different from each other.

14. The hydraulic system according to claim 12, wherein at the time of moving the hydraulic actuator in the second direction, the control circuitry brings a secondary pressure port of the first solenoid proportional valve into communication with the tank port, and brings a secondary pressure port of the second solenoid proportional valve into communication with the tank port.

15. The hydraulic system according to claim 12, wherein at the time of moving the hydraulic actuator in the second direction, the control circuitry brings a secondary pressure port of one of the first and second solenoid proportional valves into communication with the tank port, and in a case where the other one of the first and second solenoid proportional valves is the first solenoid proportional valve, the control circuitry causes the first solenoid proportional valve to output the first secondary pressure that is less than the third secondary pressure, whereas in a case where the other one of the first and second solenoid proportional valves is the second solenoid proportional valve, the control circuitry causes the second solenoid proportional valve to output the second secondary pressure that is less than the third secondary pressure.

* * * * *